(12) United States Patent
O'Neil

(10) Patent No.: US 11,522,890 B2
(45) Date of Patent: Dec. 6, 2022

(54) NETWORK APPLICATION SECURITY POLICY GENERATION

(71) Applicant: Zscaler, Inc., San Jose, CA (US)

(72) Inventor: John O'Neil, Watertown, MA (US)

(73) Assignee: Zscaler, Inc., San Jose, CA (US)

( * ) Notice: Subject to any disclaimer, the term of this patent is extended or adjusted under 35 U.S.C. 154(b) by 344 days.

(21) Appl. No.: 16/587,839

(22) Filed: Sep. 30, 2019

(65) Prior Publication Data

US 2020/0028820 A1 Jan. 23, 2020

Related U.S. Application Data

(63) Continuation of application No. 15/899,453, filed on Feb. 20, 2018, now Pat. No. 10,439,985, which is a continuation of application No. 15/896,786, filed on Feb. 14, 2018, now abandoned.

(60) Provisional application No. 62/459,248, filed on Feb. 15, 2017.

(51) Int. Cl.
| | |
|---|---|
| *H04L 9/40* | (2022.01) |
| *H04L 41/0893* | (2022.01) |
| *H04L 43/0817* | (2022.01) |
| *H04L 47/2441* | (2022.01) |
| *H04L 43/04* | (2022.01) |
| *H04L 41/14* | (2022.01) |
| *G06N 20/00* | (2019.01) |
| *H04L 41/046* | (2022.01) |
| *H04L 41/16* | (2022.01) |
| *H04L 43/026* | (2022.01) |

(52) U.S. Cl.
CPC ...... *H04L 63/1425* (2013.01); *H04L 41/0893* (2013.01); *H04L 41/145* (2013.01); *H04L 43/04* (2013.01); *H04L 43/0817* (2013.01); *H04L 47/2441* (2013.01); *H04L 63/0227* (2013.01); *H04L 63/20* (2013.01); *G06N 20/00* (2019.01); *H04L 41/046* (2013.01); *H04L 41/16* (2013.01); *H04L 43/026* (2013.01)

(58) Field of Classification Search
CPC ... H04L 41/0893; H04L 41/145; H04L 41/16; H04L 43/04; H04L 47/2441; H04L 63/0227; H04L 63/14–1425; H04L 63/20; G06N 20/00
See application file for complete search history.

(56) References Cited

U.S. PATENT DOCUMENTS

| | | | |
|---|---|---|---|
| 10,439,985 | B2 | 10/2019 | O'Neil |
| 10,498,617 | B1* | 12/2019 | Dothan ............ H04L 43/12 |
| 2014/0331280 | A1* | 11/2014 | Porras ............ H04L 63/20 726/1 |
| 2017/0374090 | A1* | 12/2017 | McGrew ............ H04L 47/2483 |
| 2019/0349283 | A1 | 11/2019 | O'Neil |
| 2020/0021618 | A1 | 1/2020 | Smith et al. |

FOREIGN PATENT DOCUMENTS

GB   2516627 A * 2/2015 ............ G06N 20/20

* cited by examiner

*Primary Examiner* — Kevin Bechtel
(74) *Attorney, Agent, or Firm* — Clements Bernard Baratta; Lawrence A. Baratta, Jr.

(57) ABSTRACT

Embodiments of the present invention generate network communication policies by applying machine learning to existing network communications, and without using information that labels such communications as healthy or unhealthy. The resulting policies may be used to validate communication between applications (or services) over a network.

20 Claims, 9 Drawing Sheets

NETWORK APPLICATION SECURITY POLICY GENERATION

CROSS-REFERENCE TO RELATED APPLICATIONS

This application is related to co-pending U.S. patent Ser. No. 15/883,534, entitled, "Network Application Security Policy Enforcement," filed on Jan. 30, 2018, which is hereby incorporated by reference herein.

BACKGROUND

Applications connected by network infrastructure communicate with each other in order to share data and perform business operations. The connection between a source application and a destination application is established by the source application, which requests a connection from its Internet Protocol (IP) address to the IP address of the destination application, typically over a specific port. Typically, existing host-based network security technologies, such as personal firewalls, use policies to allow or restrict directional access specifically at the egress or ingress point of the communication on the host on which the communication is occurring. For example, the firewall running on the host on which the source application executes typically monitors the outbound connection attempt to the destination IP address, while the firewall running on the host on which the destination application executes typically monitors the inbound connection attempt from the source IP address.

Such firewalls use policies to determine which connections and communications to allow and which to block. Generating, modifying, and deleting such policies manually, such as in changes to network topology and changes to the devices that are connected to the network, can be tedious, time-consuming, and prone to error.

SUMMARY

Embodiments of the present invention generate network communication policies by applying machine learning to existing network communications, and without using information that labels such communications as healthy or unhealthy. The resulting policies may be used to validate communication between applications (or services) over a network.

Other features and advantages of various aspects and embodiments of the present invention will become apparent from the following description and from the claims.

DETAILED DESCRIPTION

Embodiments of the present invention generate network communication policies by applying machine learning to existing network communications. The resulting policies may be used to validate communication between applications (or services) over a network. For example, policies generated by embodiments of the present invention may, for example, be enforced using techniques disclosed in the commonly-owned and concurrently-filed provisional patent application entitled, "Network Application Security Policy Enforcement." This is merely an example, however, and not a limitation of embodiments of the present invention. Policies generated using embodiments of the present invention may be enforced in any way, including ways other than those disclosed in the "Network Application Security Policy Enforcement" patent application.

Validation of policies generated by embodiments of the present invention enables an imposter application to be detected and prevented from communicating even if the imposter application communicates, or attempts to communicate, using the same name and communication content as a permitted application. This result may be achieved by validating applications using application fingerprints that can distinguish permitted applications from prohibited applications based on features other than mere application name and communication content. Additional details and embodiments of the present invention will be described in more detail below.

The term "application," as used herein, includes both applications and services. Therefore, any reference herein to an "application" should be understood to refer to an application or a service.

Figure 1:
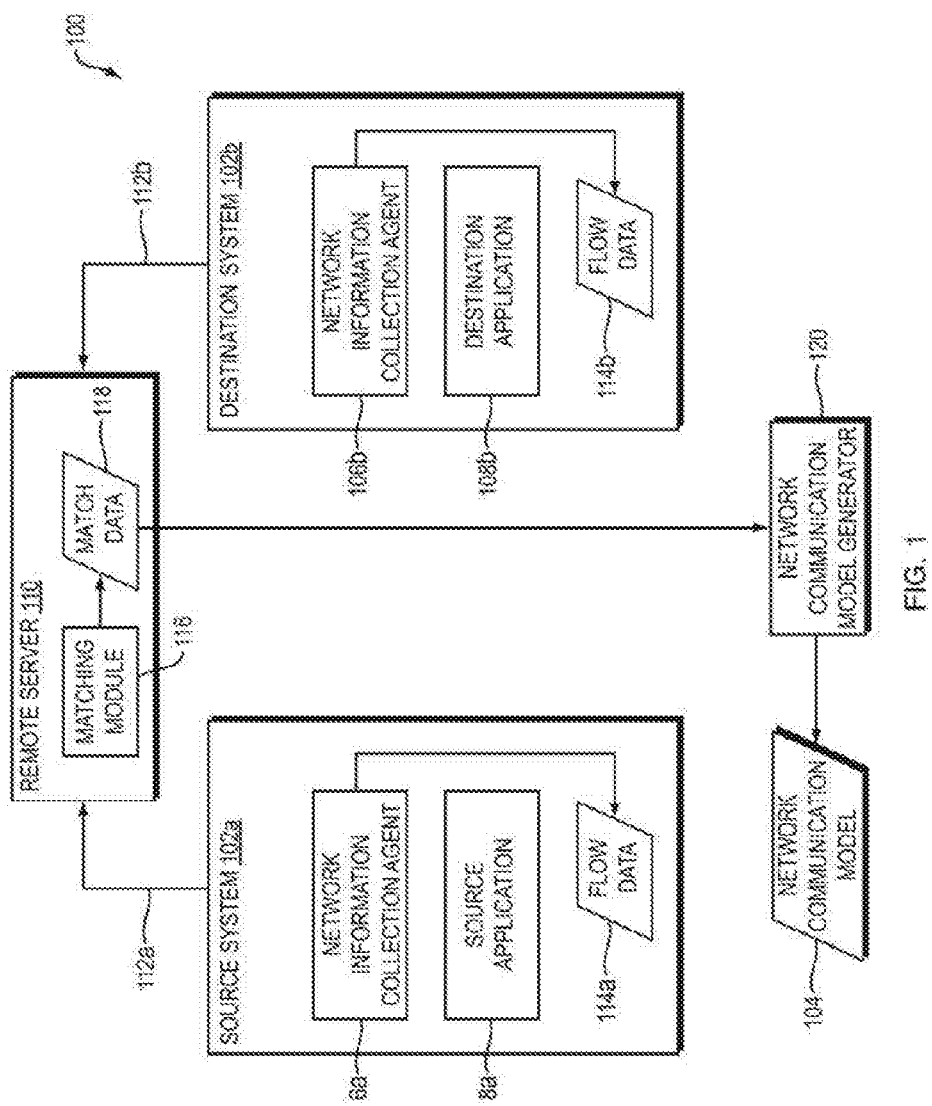
FIG. 1 is a dataflow diagram of a system for generating network application security policies according to one embodiment of the present invention.
Figure 2:
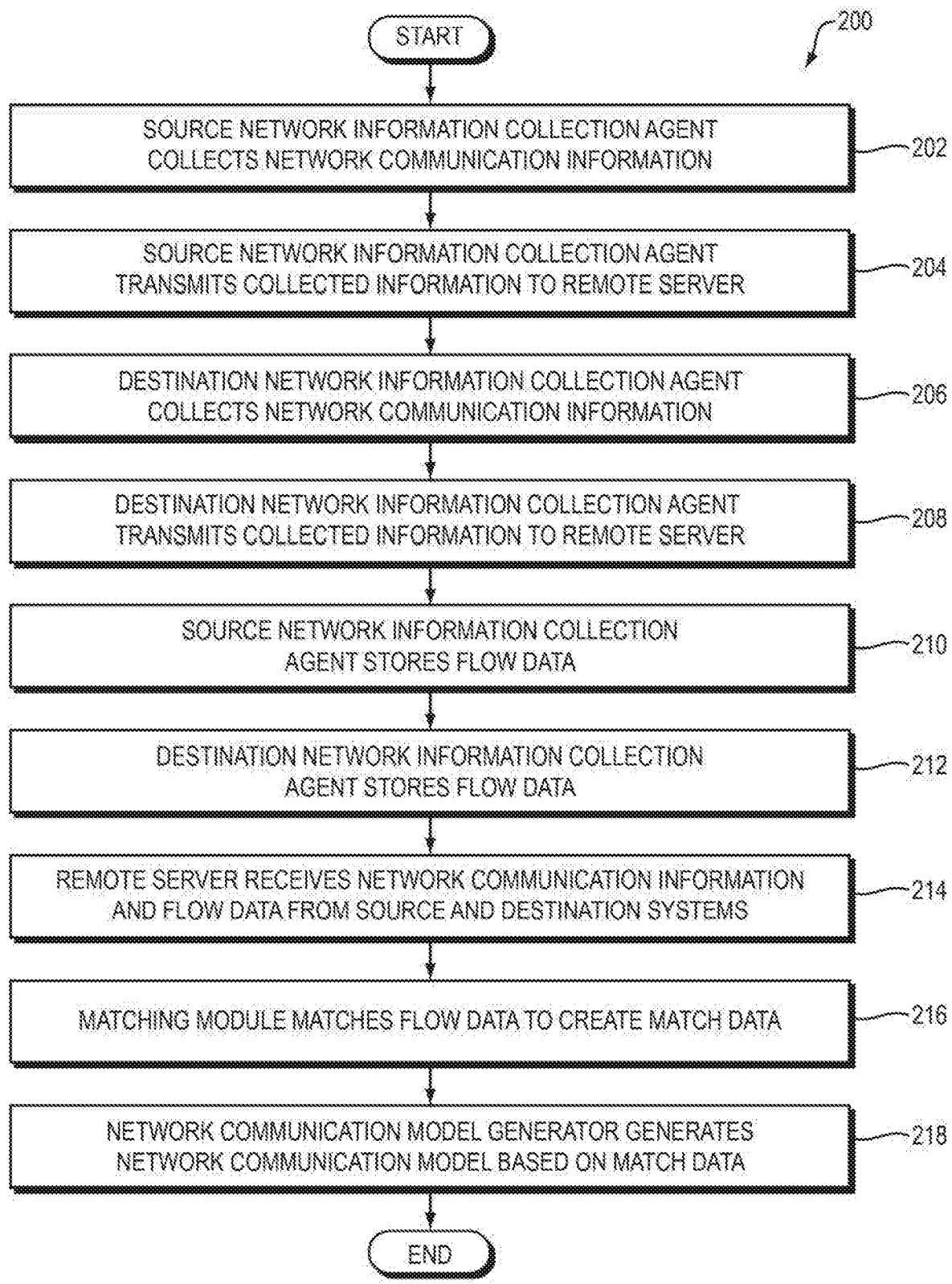
FIG. 2 is a flowchart of a method performed by the system of FIG. 1 according to one embodiment of the present invention.

Referring to FIG. 1, a dataflow diagram is shown of a system 100 for generating network application security policies according to one embodiment of the present invention. Referring to FIG. 2, a flowchart is shown of a method 200 performed by the system 100 according to one embodiment of the present invention.

In general, the system 100 and method 200 collect information about which applications are communicating with each other in the system 100. Such information includes, for example, identifying information about each such application (such as its name, the machine on which it executes, its network address, and the port on which it communicates). The system 100 and method 200 apply machine learning to such gathered information to create a model 104 based on the collected network communication information. The model 104 is generated to have at least two properties, which may be at least in part in conflict with each other: (1) accurately reflect existing network communications, and (2) be in the form of human-readable rules. The model 104 may have each such property to a greater or lesser extent.

As will be described in more detail below, the system 100 and method 200 may generate the model 104 even in the absence of training data in which particular network communications are labeled as "healthy" (i.e., desired to be permitted) or "unhealthy" (i.e., desired to be blocked). One benefit of embodiments of the present invention is that they may generate the model 104 in absence of such training data, while striking a balance between being permissive enough to permit healthy but previously unseen network communications (e.g., network communications that have properties different than the communications that were used to generate the model 104) and being restrictive enough to block previously-unseen and unhealthy network communications.

The system 100 may include any number of individual systems from which the system 100 may collect network communication information. For ease of illustration and explanation, only two systems, a source system 102a and a destination system 102b, are shown in FIG. 1. In practice, however, the system 100 may include hundreds, thousands, or more such systems, from which the system 100 may collect network communication information using the techniques disclosed herein.

A "system," as that term is used herein (e.g., the source system 102a and/or destination system 102b), may be any device and/or software application that is addressable over an Internet Protocol (IP) network. For example, each of the source system 102a and the destination system 102b may be any type of computing device, such as a server computer, desktop computer, laptop computer, tablet computer, smartphone, or wearable computer. The source system 102a and the destination system 102b may have the same or different characteristics. For example, the source system 102a may be a smartphone and the destination system 102b may be a server computer. A system (such as the source system 102a and/or destination system 102b) may include one or more other systems, and/or be included within another system. As merely one example, a system may include a plurality of virtual machines, one of which may include the source system 102a and/or destination system 102b.

The source system 102a and destination system 102b are labeled as such in FIG. 1 merely to illustrate a use case in which the source system 102a initiates communication with the destination system 102b. In practice, the source system 102a may initiate one communication with the destination system 102b and thereby act as the source for that communication, and the destination system 102b may initiate another communication with the source system 102a and thereby act as the source for that communication. As these examples illustrate, each of the source system 102a and the destination system 102b may engage in multiple communications with each other and with other systems within the system 100, and may act as either the source or destination in those communications. The system 100 may use the techniques disclosed herein to collect network communication information from any or all such systems.

The source system 102a includes a source application 104a and the destination system 102b includes a destination application 104b. Each of these applications 104a and 104b may be any kind of application, as that term is used herein. The source application 104a and the destination application 104b may have the same or different characteristics. For example, the source application 104a and destination application 104b may both be the same type of application or even be instances of the same application. As another example, the source application 104a may be a client application and the destination application 104b may be a server application, or vice versa.

Before describing the system 100 and method 200 in more detail, certain terms will be defined. The system 100 may collect information about applications that communicate with each other over a network within the system 100. The system 100 may, for example, collect such network communication information using a network information collection agent executing on each of one or more systems within the system 100. For example, in FIG. 1, source system 102a includes a network information collection agent 106a and destination system 102b includes a network information collection agent 106b. The agents 106a-b may perform any of the functions disclosed herein for collecting network communication information.

For example, the network information collection agent 106a on the source system 102a may collect, for each network communication (e.g., connection request, message, packet) transmitted or received by the source system 102a, any one or more of the following units of information (FIG. 2, operation 202):

the local IP address and port of the communication;
the remote IP address and port of the communication;
the host (machine) name of the system on which the agent 106a is executing (e.g., the source system 102a);
the name of the application transmitting or receiving the communication on the system on which the agent 106a is communicating; and
the user name of the user executing the application.

The network information collection agent 106a on the source system 102a may transmit a message 112a to a remote server 110, containing some or all of the information collected above, and/or information derived therefrom (FIG. 2, operation 204). The network information collection agent 106a may collect such information for any number of communications (e.g., at least one million, one hundred million, one billion, one hundred billion, or one trillion communications) transmitted and/or received by one or more applications (e.g., source application 108a) executing on the source system 102a, and transmit any number of instances of message 112a (e.g., at least one million, one hundred million, one billion, one hundred billion, or one hundred billion instances of message 112a) containing such collected information to the remote server 110 over time (e.g., periodically). In other words, the system 100 may repeat operations 202 and 204 for any number of communications at the source system 102a over time to collect and transmit network communication information for such communications.

The description above of the functions performed by the network information collection agent 106a on the source system 102a apply equally to a network information collection agent 106b on the destination system 102b, which may collect network communication information for any number of communications (e.g., at least one million, one hundred million, one billion, one hundred billion, or one trillion communications) transmitted and/or received by one or more applications (e.g., destination application 108b) executing on the destination system 102b using any of the techniques disclosed herein (FIG. 2, operation 206), and transmit any number of instances of message 112b (e.g., at least one million, one hundred million, one billion, one hundred billion, or one trillion instances of message 112a) containing such collected information to the remote server 110 over time (e.g., periodically) (FIG. 2, operation 208). In other words, the system 100 may repeat operations 206 and 208 for any number of communications at the destination system 102b over time to collect and transmit network communication information for such communications.

As the system 100 gathers network communication information (e.g., by using the network information collection agents 106a-b in the manner disclosed above), the system 100 may store the gathered information. The set of information that the system 100 collects in connection with a particular executing application is referred to herein as a "flow." The flow for any particular application may contain information that was collected from one or more communications transmitted and/or received by that application. The system 100 may combine multiple sequential flows between an application X and an application Y into a single flow (possibly with an associated duration). However, communication between application X and another application Z will be in a separate flow, and flows between X and Z, if there is more than one, will be combined separately from flows between X and Y. An example of a flow that may be generated as the result of collecting network communication information for a particular application (e.g., source application 108a) is the following: (1) timestamp: 1481364002.234234; (2) id: 353530941; (3) local_address: 149.125.48.120; (4) local_port: 64592; (5) lclass: private; (6) remote_address: 149.125.48.139; (7) remote_port: 62968; (8) rclass: private; (9) hostId: 144; (10) user: USER1; (11) exe: /usr/bin/java; (12) name: java; (13) cmdlineId: 9; (14) duration: 0.0.

As the network information collection agent 106a on the source system 102a gathers network communication information from network communications sent and received by applications executing on the source system 102a (e.g., source application 108a), the network information collection agent 106a may store such information in the form of flow data 114a on the source system 102a (FIG. 2, operation 210). The flow data 114a may include data representing a flow for each of one or more applications executing on the source system 102a. For example, the flow data 114a may include flow data representing a flow for the source application 108a, where the network information collection agent generated that flow data based on network communication information collected from network communications transmitted and/or received by the source application 108a. Instances of the message 112a transmitted by the network information collection agent 106a to the remote server 110 may include some or all of the flow data 114a and/or data derived therefrom.

Similarly, the network information collection agent 106b on the destination system 102b may generate flow data 114b representing a flow for each of one or more applications executing on the destination system 102b (e.g., destination application 108b), using any of the techniques disclosed herein in connection with the generation of the flow data 114a by the network information collection agent 106a (FIG. 2, operation 212). Instances of the message 112b transmitted by the network information collection agent 106b to the remote server 110 may include some or all of the flow data 114b and/or data derived therefrom.

The term "flow object," as used herein, refers to a subset of flow data that corresponds to a particular application. For example, one or more flow objects within the flow data 114a may correspond to the source application 108a, and one or more flow objects within the flow data 114b may correspond to the destination application 108b. A flow object which corresponds to a particular application may, for example, contain data specifying that the source application 108a is the source application of the flow represented by the flow object. As another example, a flow object which corresponds to a particular application may, for example, contain data specifying that the destination application 108b is the destination application of the flow represented by the flow object.

Now consider a flow object, within the flow data 114a, corresponding to the source application 108a. Assume that this flow object represents the source application 108a's side of communications between the source application 108a and the destination application 108b. There is, therefore, also a flow object, within the flow data 114b, corresponding to the destination application 108b's side of the communications between the source application 108a and the destination application 108b. Assume that the network information collection agent 106a on the source system 102a transmits messages 112a containing the flow object representing the source application 108a's side of its communications with the destination application 108b, and that the network information collection agent 106b on the destination system 102b transmits messages 112b contain the flow object representing the destination application 108b's side of its communications with the source application 108a. As a result, the remote server 110 receives, and may store, information about both the flow object corresponding to the source application 108a and the flow object corresponding to the destination application 108b (FIG. 2, operation 214).

These two flow objects, which correspond to the two ends of an application-to-application communication (i.e. between the source application 108a and the destination application 108b), may match up or correlate with each other in a variety of ways. For example, the local IP address and port of the flow object corresponding to the source application 108a is the same as the remote IP address and port, respectively, of the flow object corresponding to the destination application 108b, and vice versa. In other words, the flow object corresponding to the source application 108a may contain data specifying a particular remote IP address and port, and the flow object corresponding to the destination application 108b may contain data specifying the same remote IP address and port as the flow object corresponding to the source application 108a. Various other data within these two flow objects may match up with each other as well.

A matching module 116 in the remote server 110 may identify flow objects that correspond to the two ends of an application-to-application communication, and then combine some or all of the data from the two flow objects into a combined data structure that is referred to herein as a "match object," which represents what is referred to herein as a "match" (FIG. 2, operation 216). A "match," in other words, represents the two corresponding flows at opposite (i.e., source and destination) ends of an application-to-application communication.

More generally, the matching module 116 may receive collected network information from a variety of systems within the system 100, such as by receiving network information messages 112a from the source system 102a and network information messages 112b from the destination system 102b. As described above, these messages 112a-b may contain flow data representing information about flows in the source system 102a and destination system 102b, respectively. The matching module 116 may then analyze the received flow data to identify pairs of flow objects that represent opposite ends of application-to-application communications. For each such identified pair of flow objects, the matching module 116 may generate a match object representing the match corresponding to the pair of flow objects. Such a match object may, for example, contain the combined data from the pair of flow objects.

The matching module 116 may impose one or more additional constraints on pairs of flow objects in order to conclude that those flow objects represent a match. For example, the matching module 116 may require that the transmission time of a source flow object (e.g., in the source flow data 114a) and the receipt time of a destination flow object (e.g., in the destination flow data 114b) differ from each other by no more than some maximum amount of time (e.g., 1 second) in order to consider those two flow objects to represent a match. If the difference in time is less than the maximum permitted amount of time, then the matching module 116 may treat the two flow objects as representing a match; otherwise, the matching module 116 may not treat the two flow objects as representing a match, even if they otherwise satisfy the criteria for a match (e.g., matching IP addresses).

The system 100 also includes a network communication model generator 120, which receives the match data 118 as input and generates the network communication model 104 based on the match data 118 (FIG. 2, operation 218). Because the matches represent flows, which in turn represent actual communications within the network, the network communication model generator 120 generates the network communication model 104 based on actual communications within the network.

As mentioned above, the network communication model generator 120 may generate the network communication model 104 with the following constraints:
(1) The rules in the model 104 should accurately reflect the actual observed network communications, as represented by the match data 118.
(2) The match data 118 may be the sole source of the data that the network communication model generator 120 uses to generate the network communication model 104, and the match data 118 may not contain any labels or other a priori information about which communications represented by the match data 118 are healthy or unhealthy. The network communication model generator 120 may, therefore, learn which observed communications are healthy and which are unhealthy without any such a priori information. This is an example of an "unsupervised" learning problem.
(3) The resulting rules in the network communication model 104 should allow for natural generalizations of the observed network communications represented by the match data 118, but not allow novel applications to communicate on the network without constraint. The rules, in other words, should minimize the number of misses (i.e., unhealthy communications which the model 104 does not identify as unhealthy), even though the match data 118 may represent few, if any, unhealthy communications and any unhealthy communications which are represented by the match data 118 may not be labeled as such.
(4) The model 104 should be in a form that humans can read, understand, and modify, even if doing so requires significant dedication and attention. Most existing machine learning algorithms are not adequate to produce rules which satisfy this constraint, because they tend to create complex, probabilistic outputs that people—even experts—find daunting even to understand, much less to modify.
(5) The match data 118 may contain billions of matches, resulting from months of matches collected from a medium-to-large corporate network containing thousands of systems. The network communication model generator 120, therefore, should be capable of processing such "big data" to produce the network communication model 104. It may not, for example, be possible to load all of the match data 118 into RAM on a single computer. As a result, it may be necessary to use one or both of the following:
a. Algorithms that process the match data 118 in a distributed fashion, such as MapReduce.
b. Algorithms that process data in a streaming fashion, by using a processor to sequentially read the data and then to update the model 104 and then forget (e.g., delete) the data that it has processed.

Not all embodiments of the present invention need satisfy, or even attempt to satisfy, all of the constraints listed above. Certain embodiments of the present invention may, for example, only even attempt to satisfy fewer than all (e.g., two, three, or four) of the constraints listed above. Regardless of the number of constraints that a particular embodiment of the present invention attempts to satisfy, the embodiment may or may not satisfy all such constraints in its generation of the resulting model 104, and may satisfy different constraints to greater or lesser degrees. For example, the model 104 that results from some embodiments of the present invention may be easily understandable and modifiable by a human, while the model 104 that results from other embodiments of the present invention may be difficult for a human to understand and modify.

The resulting model 104 may, for example, be or contain a set of rules, each of which may be or contain a set of feature-value pairs. A rule within the model 104 may, for example, contain feature-value pairs of the kind described above in connection with an example flow (e.g., timestamp: 1481364002.234234; id: 353530941). The term "accept" is used herein in connection with a rule R and a match M as follows: a rule R "accepts" a match M iff for each feature-value pair (F, V) in rule R, match M also contains the feature F with the value V. As a result, rule R will accept match M if the set of feature-value pairs in rule R is a subset of the set of feature-value pairs in match M. Furthermore, if at least one rule in the model 104 accepts match M, then the match is accepted by the set of rules.

Examples of various techniques that the network communication model generator 120 may use to generate the network communication model 104 will now be described. These particular techniques are merely examples and do not constitute limitations of the present invention.

Figure 3:
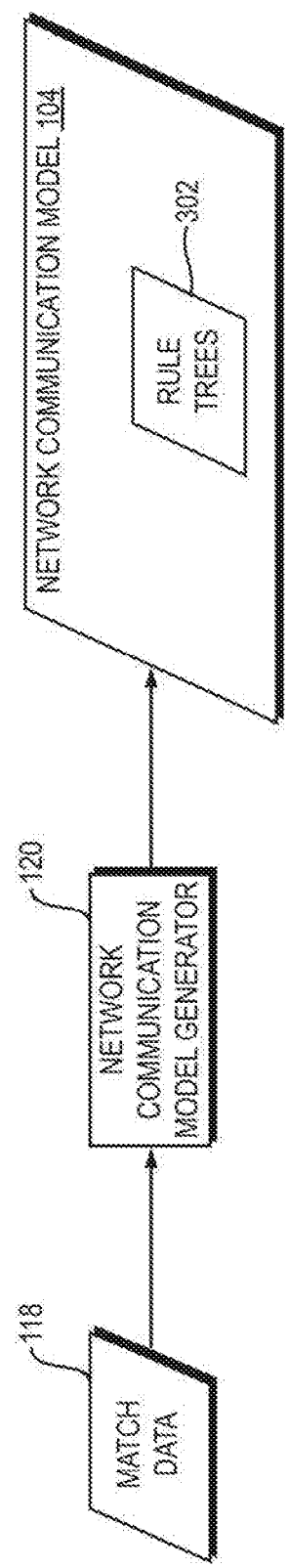
FIG. 3 is a dataflow diagram of a system for using machine learning to generate a network communication model using an unsupervised decision tree according to one embodiment of the present invention.
Figure 4:
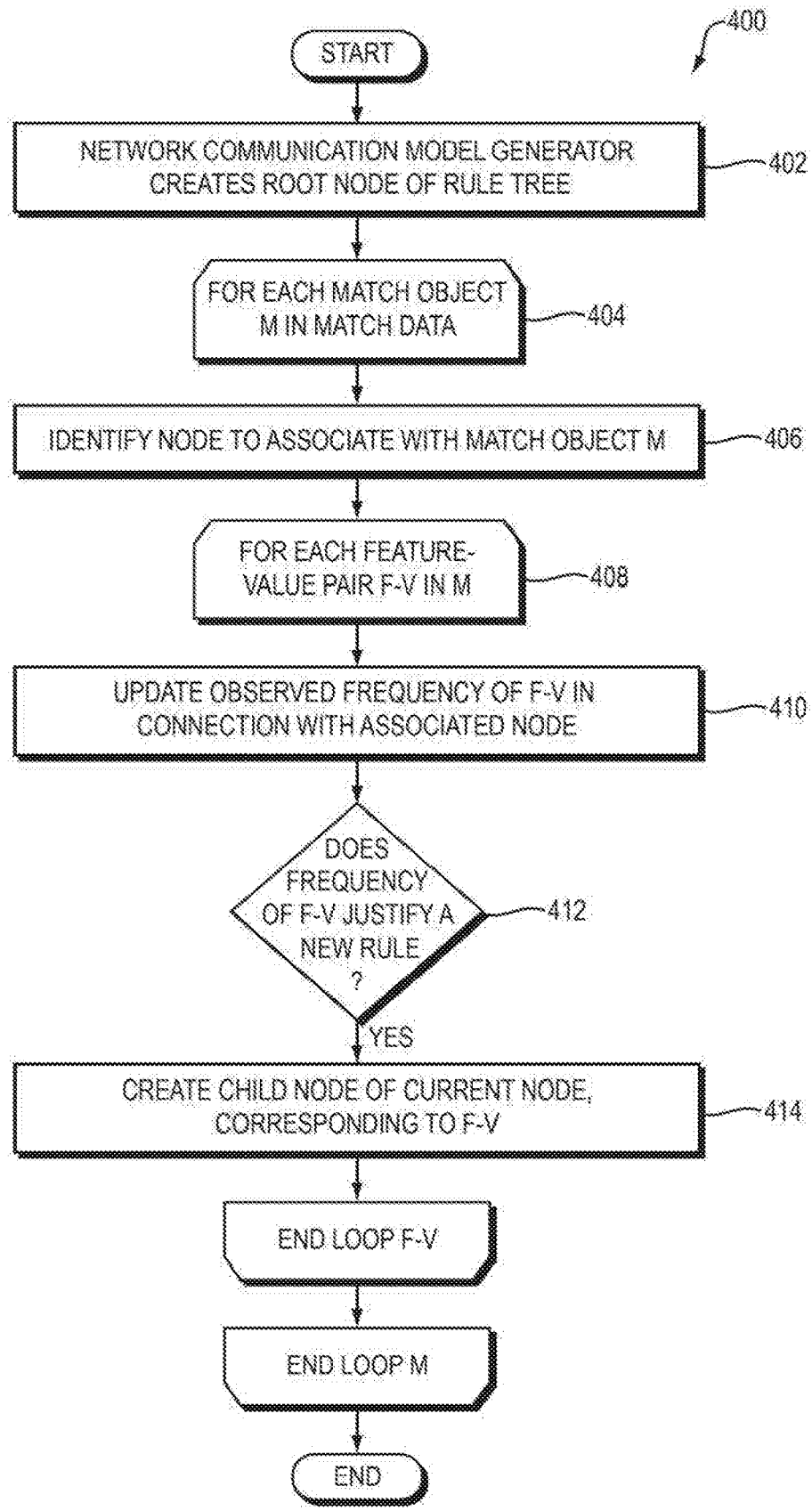
FIG. 4 is a flowchart of a method performed by the system of FIG. 3 according to one embodiment of the present invention.

Referring to FIG. 3, a dataflow diagram is shown of a system 300 for using what is referred to herein as an "unsupervised decision tree" to generate the network communication model 104 according to one embodiment of the present invention. Referring to FIG. 4, a flowchart is shown of a method 400 performed by the system 300 of FIG. 3 according to one embodiment of the present invention. In general, in the unsupervised decision tree embodiment, the network communication model generator 120 makes multiple passes over the match data 118 and "grows" rule trees 302 within the network communication model 104 when enough evidence has been discovered to justify each such rule tree. When the model 104 becomes accurate enough (e.g., as decided by a user of the system 300), the network communication model generator 120 terminates and returns the existing rule trees 302 as the network communication model 104. The network communication model 104 may then be used to enforce the rules, represented by the rule trees 302, on network communications, such as by using the techniques disclosed in the above-referenced U.S. provisional patent application entitled, "Network Application Security Policy Enforcement."

As described above, the match data 118 may be very large, e.g., billions of matches. The system 300 and method 400 may be applied to such a large set of data, which may effectively be treated as if it were infinite in size. In other words, there is no limit to the size of the match data 118 to which the system 300 and method 400 may be applied. If the match data 118 contains a finite number of match objects, then the network communication model generator 120 may make one or more passes over the match data 118. The network communication model generator 120 may perform the method 400 of FIG. 4 to all of the match data 118 as a whole, or may split the match data 118 into multiple subsets (bins), and apply the method 400 of FIG. 4 to each such bin, possibly in parallel, to create a plurality of unsupervised decision trees. For ease of illustration and explanation, the system 300 and method 400 will be described as being applied to the entire set of match data 118 as a single data stream.

The following description will describe the match data 118 as a stream of match objects M, which are processed sequentially by the network communication model generator 120. Recall that each match object M represents a match containing one or more feature-value pairs. Note that, in general, each such match may contain any kind of data, such as integers, floating point values, strings, or more complex data structures. All that is required is that the network communication model generator 120 be capable of determining whether any two feature-value pairs are equal to each other.

The network communication model generator 120 begins by creating a root node within the rule trees 302 (FIG. 4, operation 402). This root node does not correspond to any particular feature-value pair, and may be represented textually as { }. The purpose of the root node is to collect statistics on the feature-value pairs that are observed in the match data 118.

The network communication model generator 120 sequentially examines each match object M in the match data 118 (FIG. 4, operation 404). The network communication model generator 120 selects a node in the rule trees 302 to associate with match object M (FIG. 4, operation 406). Because, at this point in the current example, the rule trees 302 only contain the root node, match object M is associated with the root node in operation 406. More details will be provided below about how to associate a match object with a node once the rule trees 302 contain additional nodes. The network communication model generator 120 updates, for each feature-value pair that is observed in the match object M (FIG. 4, operation 408), a count (frequency) of the number of times that feature-value pair has been observed in the match data 118 (FIG. 4, operation 410). This frequency data is stored in association with the root node because no other nodes have yet been created in the tree. As will be described in more detail below, once additional nodes have been created in the tree, the matching module 116 determines which node's associated statistics to update as additional frequency-value pairs are observed in the match data 118.

For example, the first time the network communication model generator 120 observes a particular feature-value pair in the match data 118, the network communication model generator 120 may associate a frequency counter for that frequency-value pair with the root node and initialize that frequency counter to one; the next time the network communication model generator 120 observes the same feature-value pair in the match data 118, the network communication model generator 120 may increment the frequency counter for that feature-value pair; and so on. The network communication model generator 120 may store, within the root node, for each feature-value pair that has been observed in the match data 118: (1) an identifier of the feature-value pair (e.g., the feature and value themselves); and (2) the frequency counter for that feature-value pair, including the current value of the observed frequency of that feature-value pair.

As the network communication model generator 120 updates the feature-value frequencies as described above, the network communication model generator 120 determines, for each such feature-value frequency, whether the value of that frequency represents sufficient evidence to confidently hypothesize a rule for that feature-value pair (FIG. 4, operation 412). If the network communication model generator 120 determines that the value of the frequency for a particular feature-value pair represents sufficient evidence to confidently hypothesize a rule for that feature-value pair, then the network communication model generator 120 creates a child node of the root node, where the child node corresponds to the particular feature-value pair (FIG. 4, operation 414). In the description herein, we refer to nodes by the set of feature-value pairs that lead to them. In this example, the root node is referred to as { }, and if the feature-value pair that led to the creation of the first child node is F1:V1, then we refer to the first child node herein as {F1:V1}. The network communication model generator 120 may store, within this first child node: (1) an identifier of the feature-value pair F1:V1, and (2) a frequency counter for the feature-value pair F1:V1, including the current value of the observed frequency of that feature-value pair.

This simple example, in which the rule trees 302 begin with one tree having a root node and one child node of that root node, illustrates the beginning of how a rule tree is grown by the system 300 and method 400. Once the rule trees 302 contain at least one child node, then, as the network communication model generator 120 observes additional match objects in the match data 118, the network communication model generator 120 must select a node with which to associate each such match object (as mentioned above in connection with operation 406 in FIG. 4). To do this for a particular match object M, the network communication model generator 120 may identify the branch in the rule trees 302 that most closely matches the set of feature-value pairs in the match object M. Because each node in the rule trees 302 is associated with a particular unique set of feature-value pairs leading to it from the root node, and each child node C of a node N is associated with a different (previously unused) feature-value pair, the network communication model generator 120 may determine the node with which to associate a particular match object in the match data 118 by identifying the node in the rule trees 302 that is associated with the set of feature-value pairs that maximally matches the set of feature-value pairs in the match object. The network communication model generator 120 may then update the frequency counters associated with the identified node based on the feature-value pairs in the match object, such as by incrementing, in the identified node, the frequency counter for each feature-value pair in the match object. It is necessary to guarantee that each path from the tree root node to every node in the tree creates a unique set of feature-value pairs. In one embodiment, this guarantee is accomplished by keeping track of the order in which each child node C (and each F-V pair) is added to each node N. Then, each match object M is compared with a node's children (and, more the feature-value pair associated with each child) in that order (i.e. in the order originally added). This eliminates ambiguities about which path to take, and guarantees that each path from the root to a node is a unique set of feature-value pairs.

As the network communication model generator 120 examines additional match objects in the match data 118 and updates the feature-value frequencies in the nodes of the rule trees 302 in the manner described above, the network communication model generator 120 may use the techniques described above to identify additional feature-value pairs having frequencies representing sufficient evidence to confidently hypothesize rules for them. For example, the network communication model generator 120 may repeatedly determine analyze the frequency counters of all feature-value pairs associated with all nodes in the rule trees 302 and, in response to identifying any such frequency representing sufficient evidence to confidently hypothesize a rule for the corresponding feature-value pair, the network communication model generator 120 may create a child node of the node associated with that feature-value pair, and associate the child node with the feature-value pair.

Thereafter, when we send matches to the tree, it looks at the match to see if it contains A:B, and if it does, it sends the match to that child node without adding the match's F-V pairs to its own statistics.

Although the description above describes creating each node within the rule trees 302 individually and immediately, this is merely an example and does not constitute a limitation of the present invention. Alternatively, for example, the network communication model generator 120 may wait until some number of new nodes have been justified, and then create a plurality of nodes in the rule trees 302 in a batch.

As described above, the network communication model generator 120 may create a new child node corresponding to a particular feature-value pair only once the network communication model generator 120 has determined that the feature-value pair's observed frequency of occurrence represents sufficient evidence to confidently hypothesize a rule for that feature-value pair. The network communication model generator 120 may make this determination using any of a variety of standards for "sufficiency" of evidence. For example, the network communication model generator may use Hoeffding's Inequality to determine whether there is sufficient evidence to justify creation of a new child node corresponding to a particular feature-value pair. As described above, each node in the rule trees 302 collects the probabilities for each feature-value pair that it has seen (where the probability associated with each feature-value pair may be calculated as the percentage of observed matches which contain the feature-value pair). The goal is to know when the most probably feature-value pair FV1 "deserves" to have a child node created for it in the rule trees 302. Let 1−delta be the confidence that the network communication model generator 120 has selected the correct feature-value pair to have a child node created for it. In other words, delta is the acceptable risk that the wrong feature-value pair is chosen to have a child node created for it. Let R be the range of the random variables (if, as in this example, the random variables are probabilities, then R=1). Let N be the number of elements seen by the current node being considered.

Now consider G=prob(FV1)−prob(FV2), which is the difference between the most probable feature-value pair FV1 and the second most probable feature-value pair FV2.

According to the Hoeffding Inequality, if G>eta, then we can hypothesize the new node, with confidence 1−delta, where:

$$eta = \sqrt{R^2 * \log(1/\text{delta})/(2*N)}$$

Note that the Hoeffding Inequality is independent of the probability distribution of the feature-value pairs.

In this way, the system 300 and method 400 grow the rule tree(s) 302 until a stopping point is reached. The stopping point may, for example, be:

(1) after some number of matches have been observed by the network communication model generator 120 in the match data 118;

(2) after the network communication model generator 120 has performed some number of iterations over the match data 118;

(3) once the rule tree(s) 302 have approximately stopped (or slowed) growing, such as by not growing by more than some number of nodes or by some percentage of size within some amount of time (e.g., number of observations by the network communication model generator 120); or (4) once the rule tree(s) 302 have reached at least some minimum desired size or complexity.

In response to determining that such a stopping point has been reached, the network communication model generator 120 may return the leaves of the rule tree(s) 302 as a set of rules for use within the network communication model 104, where each such leaf may be associated with (and contain data representing) the set (e.g., sequence) of feature-value pairs associated with the branch of the rule tree that contains the leaf. Each such set of feature-value pairs represents a rule.

Figure 5:
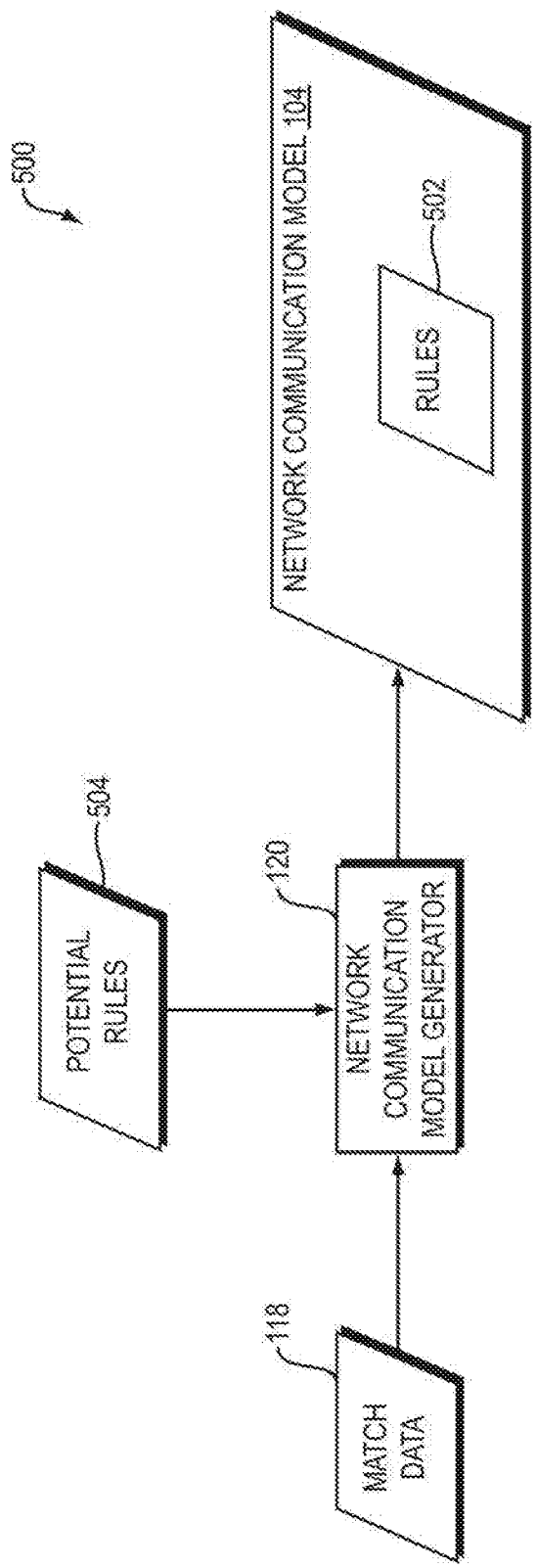
FIG. 5 is a dataflow diagram of a system for using frequent itemset discovery to generate a network communication model according to one embodiment of the present invention.
Figure 6:
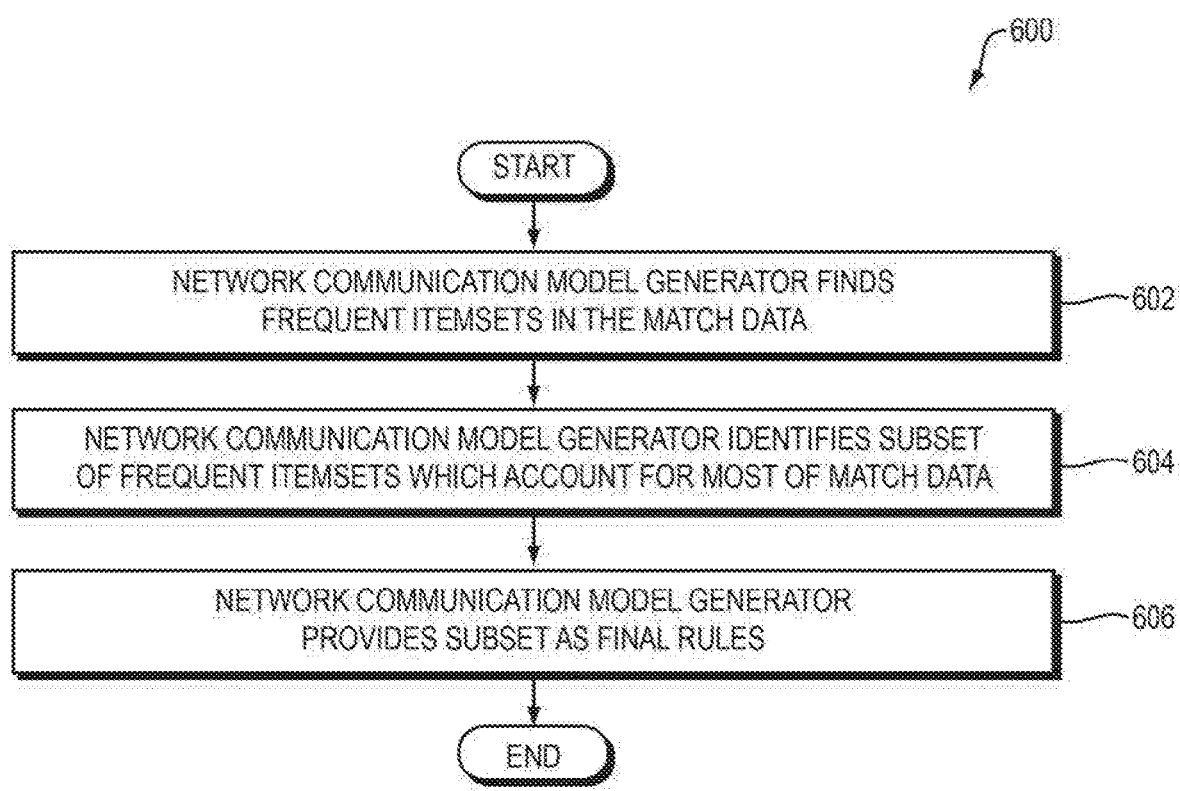
FIG. 6 is a flowchart of a method performed by the system of FIG. 5 according to one embodiment of the present invention.

Referring to FIG. 5, a dataflow diagram is shown of a system 500 for using what is referred to herein as an "frequent itemset discovery" to generate the network communication model 104 according to one embodiment of the present invention. Referring to FIG. 6, a flowchart is shown of a method 600 performed by the system 500 of FIG. 5 according to one embodiment of the present invention. In general, in the frequent itemset embodiment, the network communication model generator 120 creates rule candidates within the network communication model 104. These rule candidates serve as an initial candidate set of rules 502 within the network communication model 104. The network communication model generator 120 then uses a greedy algorithm or an evolutionary algorithm (both of which may be implemented as MapReduce algorithms) to winnow down a set of possible rules into a smaller (possibly far smaller) set of "covering" rules. The network communication model generator 120 terminates and returns the resulting winnowed set of rules 502 as the network communication model 104. The network communication model 104 may then be used to enforce the rules 502 on network communications, such as by using the techniques disclosed in the above-referenced U.S. provisional patent application entitled, "Network Application Security Policy Enforcement."

More specifically, the network communication model generator 120 finds a set of feasible potential rules by identifying frequent itemsets among the matches in the match data 118, where each element is a set of feature-value pairs in the form of a match represented by a match object in the match data 118 (FIG. 6, operation 602). The network communication model generator 120 may perform this using, for example, the parallel FP-Growth algorithm, as described in the following paper: Li, Haoyuan and Wang, Yi and Zhang, Dong and Zhang, Ming and Chang, Edward Y.

(2008) "Parallel FP-growth for Query Recommendation," Proceedings of the 2008 ACM Conference on Recommender Systems. The output of this algorithm is a list of sets of items (in this case, feature-value pairs in the form of match objects) that were observed frequently (e.g., more than some threshold number of times) in the match data 118.

The network communication model generator 120 may treat each such itemset to be a potential rule for use in the set of rules 502 in the network communication model 104. The network communication model generator then identifies a subset of this set of potential rules 504, by identifying a much smaller subset of those potential rules which account for all or almost all of the match data (FIG. 6, operation 604). The network communication model generator 120 may then provide the resulting identified subset of the potential rules 504 as a set of final rules 502 within the network communication model 104 (FIG. 6, operation 606). The network communication model generator 120 may identify the subset 502 of the potential rules 504 in any of a variety of ways, such as any one or more of the following.

The network communication model generator 120 may identify the final rules 502 as a subset of the potential rules 504 using a greedy algorithm. Using this algorithm, the network communication model generator 120 may enter a loop over each feature-value set (i.e., match object) M. The network communication model generator 120 may consider all of the itemsets in the potential rules 504 as potential rules for the match object M. For the match object M, the network communication model generator may examine the itemsets in the potential rules 504 in order, starting from the itemset(s) with maximum length and then proceeding through the itemset(s) of decreasing length until and including the itemset(s) of minimum length. If there are multiple itemsets having the same length, then the network communication model generator 120 processes those multiple itemsets in decreasing order of observed frequency within the match data 118 (e.g., by processing the highest-frequency itemset(s) first and proceeding in order of decreasing frequency).

In one embodiment, as the network communication model generator 120 examines each itemset in the potential rules 504 in the order described above, when the network communication model generator 120 encounters the first itemset that is a subset of the match object M, the network communication model generator 120 increments a count associated with that itemset, and stops examining itemsets in the potential rules in connection with match object M. In another embodiment, the model generator 120 does not stop examining itemsets after encountering the first match, but instead continues to evaluate itemsets until a certain number have been found and then stops. In yet another embodiment, the model generator 120 processes randomly selected subsets of the full itemset list with a probability proportional to the number of times that itemset was observed in the itemset finding process. In any of these embodiments, the network communication model generator 120 may repeat the same process described above for the remaining match objects M in the match data 118.

Once the network communication model generator 120 has processed all of the itemsets in the potential rules 504 in the manner described above, the network communication model generator 120 returns the itemsets in the potential rules 504 which have non-zero counts as the set of final rules 502. The network communication model generator 120 need not, however, include all non-zero count itemsets within the final set of rules 502. The network communication model generator 120 may, for example, exclude, from the rules 502, one or more itemsets having small counts, such as counts falling below some particular threshold, or some number of percentage of the lowest-count itemsets in the potential rules. Because such low-count rules typically and redundantly also accept data previously accepted by other rules, pruning low-count itemsets typically removes much of the redundancy from the final rules 502.

Figure 7:
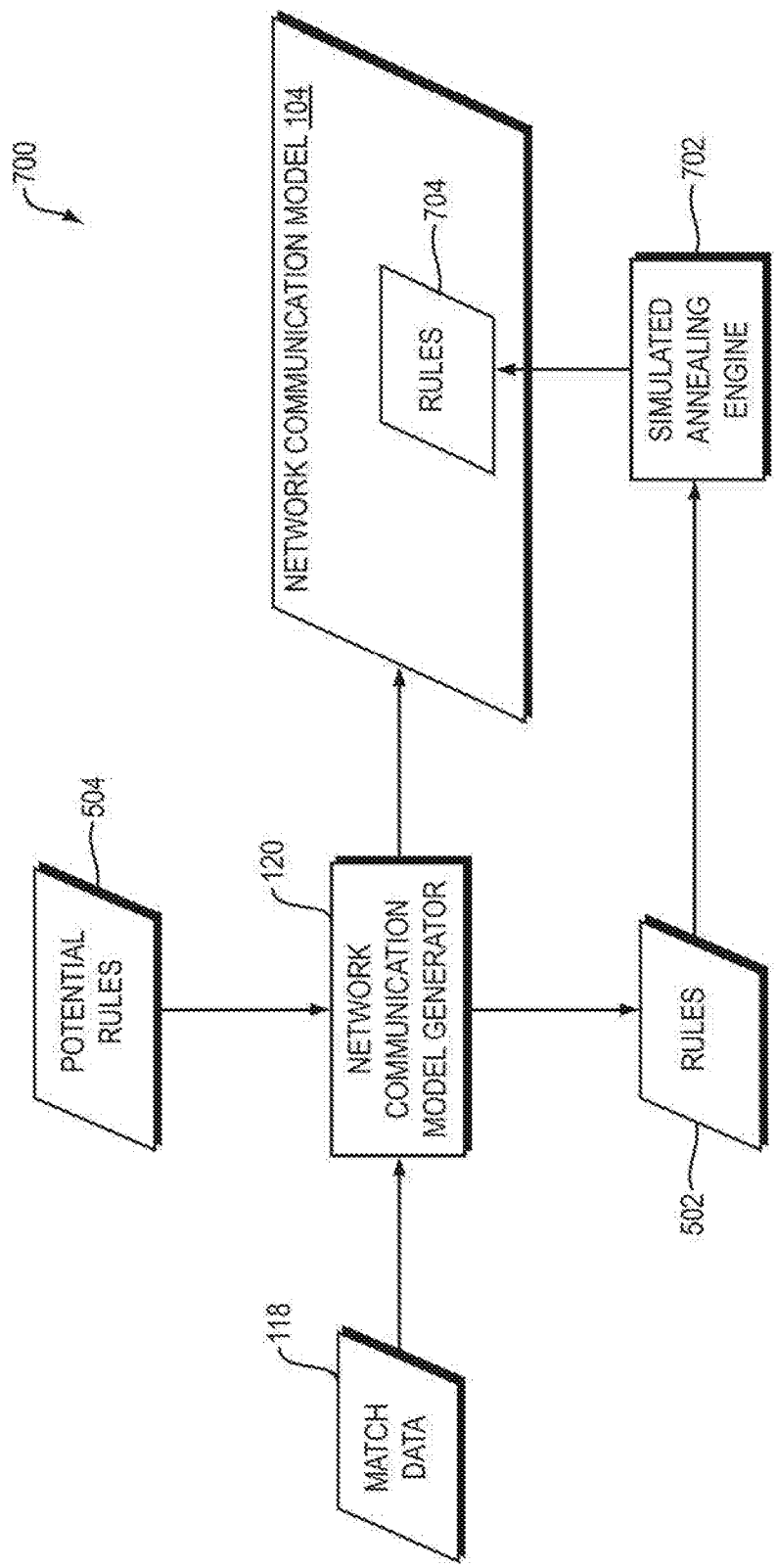
FIG. 7 is a dataflow diagram of a system for using simulated annealing to generate a network communication model according to one embodiment of the present invention.
Figure 8:
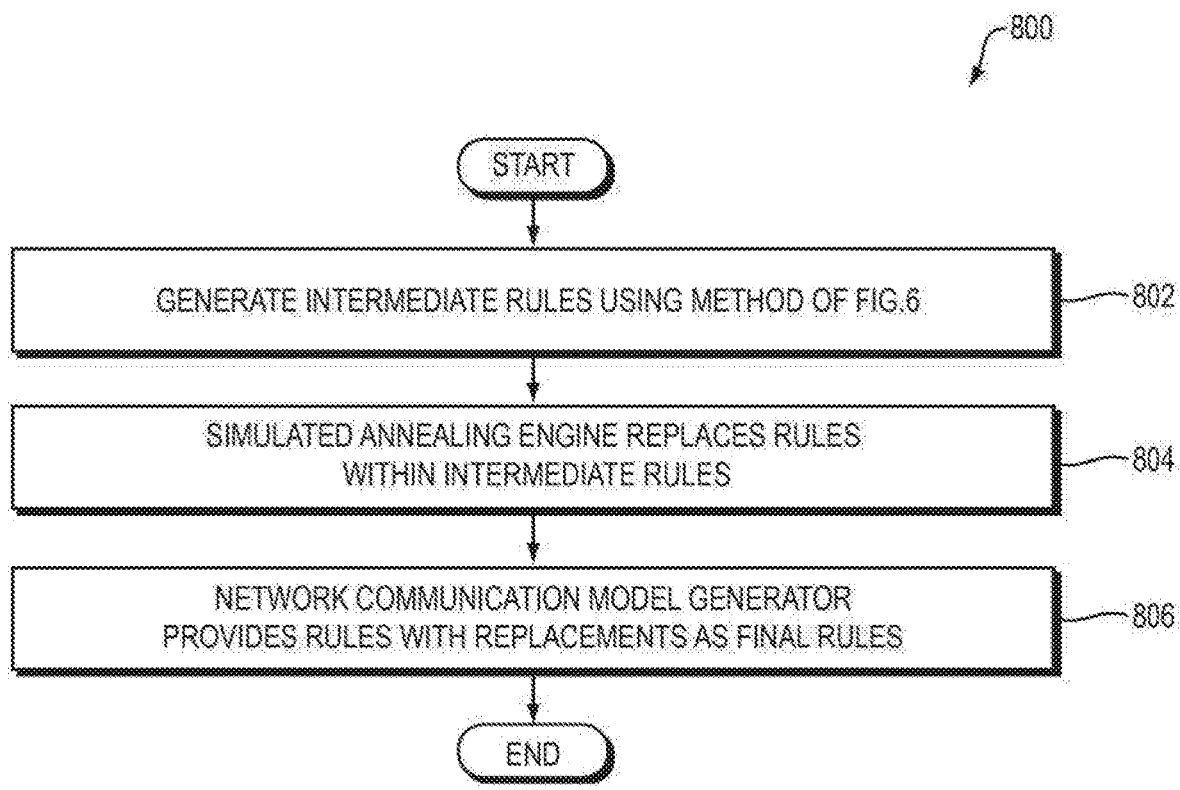
FIG. 8 is a flowchart of a method performed by the system of FIG. 7 according to one embodiment of the present invention.

In yet another embodiment of the present invention, and as illustrated by the system 700 of FIG. 7, the network communication model generator 120 generates the rules 502 using the greedy algorithm approach described above (FIG. 8, operation 802). In the system 700 of FIG. 7, however, the rules 502 are not treated as the final set of rules, but instead are treated as an intermediate set of rules. A simulated annealing engine 702 within the system 700 replaces rules within the intermediate rules 502 (FIG. 8, operation 804), thereby producing a final set of rules 704 within the network communication model 104 (FIG. 8, operation 806). The final rules 704 reduce redundancy without reducing accuracy, relative to the intermediate set of rules 502.

More specifically, the simulated annealing engine 702 may randomly select rules for replacement within the rules 502, where the probability that the simulated annealing engine 702 will select any particular one of the rules 502 for replacement is related to the inverse of that rule's count. As a result, in practice, low-count rules may almost always be chosen for replacement. The probability of replacing a particular rule R may be assigned in any of a variety of ways such as by using the following formula:

prob($R$)=1.0−count($R$)/count(allData)

As another example, the probability of replacing a particular rule R may take the rule R's redundancy into account in addition to the count of the rule R, such as by using the following formula:

prob($R$)=redundancy($R$)/count($R$)/NormalizationConstant

Redundancy is defined as the number of match objects a rule matches, minus the number only it matches.

Regardless of how the probability of rule R is calculated or otherwise assigned, the network communication model generator may decide whether to replace rule R with another randomly selected non-zero count rule S, with a probability that is dependent on how much better the new rule S is compared to the old rule R, where:

if count($S$)>count($R$)then prob(accept)=1 otherwise prob(accept)=exp(−(count($R$)−count($S$)))/$T\_i$)

where $T\_i$ is a (positive) "temperature" that decreases for each successive iteration (i.e., attempt to replace rule R), so that rule replacements become less likely as iterations continue.

The suitability of a rule is related to how many of the underlying matches it "covers," and covers uniquely. This depends on all the other rules in the intermediate set of rules 502. To evaluate this goal may require a MapReduce iteration, because we need to visit the original match data 118 in order to recount, as described above. Since a MapReduce iteration on a large amount of data is slow, we prefer to reduce this by only re-evaluating the proposed rule set by "batching" several multiple potential rule changes and testing them together. It is also possible to estimate this MapReduce operation by creating a "sketch" of the data supported by each rule, for example by a data structure similar to a Bloom Filter, and estimating the results of the MapReduce operation more cheaply. Therefore, it may be helpful for the simulated annealing engine to "batch" multiple potential rule replacements into a single MapReduce operation.

Although a process of simulated annealing is described in connection with FIG. 7, other techniques, such as evolutionary optimization, may be applied to achieve similar results. For example, evolutionary optimization may be used to generate a population of alternative rule sets, which in term "spawn" alternative rule sets, and then to prune out "unfit" alternative rule sets, so that only the most fit rule sets survive for the next iteration.

The embodiments described above may be modified in a variety of ways. For example, as described above, the system 100 of FIG. 1 may create sets of feature-value pairs within the rules in the network communication model 104. Embodiments of the present invention may additionally create and store data referred to herein as "feature clusters" (or simply "clusters") within the network communication model 104. A feature cluster corresponding to a particular feature F may, for example, be a subset of the set of values that are assigned to feature F in the match data 118. Without loss of generality, such a feature cluster may correspond to a set of features, where the values for the features in that set are of the same type (e.g., the values for all features in the set are applications, or the values of all features in the set are hosts). As an illustrative example, and without limitation, assume that the set of application names that have been observed in network communications and reflected in the match data 118 (that is, the values of either the "local_application_name" or the "remote_application_name" feature, both features taking applications as their values) are associated with the set of integers from 1 to N, inclusive. In this example, assume that a subset of the set of application names—such as {2, 15, 27, 41}—is selected to be a feature cluster for the application name feature, which will be referred to herein as feature cluster A.

Figure 9:
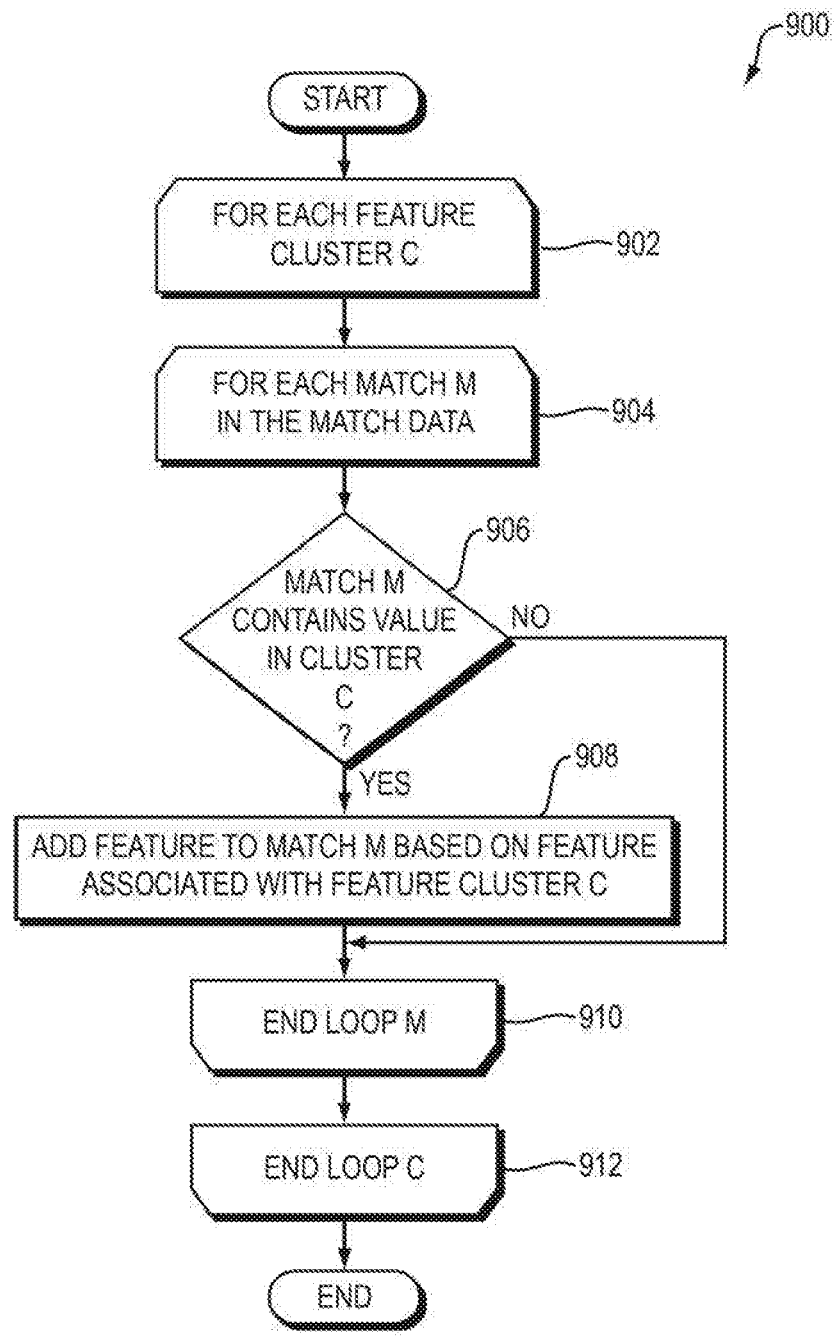
FIG. 9 is a flowchart of a method that the network communication model generator uses to update the match data based on feature clusters according to one embodiment of the present invention.

Referring to FIG. 9, a flowchart is shown of a method 900 that the network communication model generator 120 may use to update the match data 118 based on feature clusters according to one embodiment of the present invention. In the description of the method 900 of FIG. 9, the feature cluster A, above, will be used as an example, but it should be understood that the method 900 of FIG. 9 may be used in connection with any feature cluster(s). As the network communication model generator 120 creates the network communication model 104, then for each feature cluster C (FIG. 9, operation 902) and for each match M in the match data 118 (FIG. 9, operation 904), the network communication model generator 120 may determine whether match M contains an application name (e.g., a value of the "local_application_name" feature or the "remote_application_name" feature) which is in feature cluster C (e.g., feature cluster A, above) (FIG. 9, operation 906). If there is such a match M, then the network communication model generator 120 adds, to match M, the feature that corresponds to feature cluster C, with the same value that was found in operation 906 in feature cluster C (FIG. 9, operation 908). For example, in the case of feature cluster A, above, an application name cluster feature (e.g., a "local_application_name_cluster" feature or a "remote_application_name_cluster" feature) may be added to match M. For example, assume that match M contains the following features and corresponding values:
   local_app_name: 7
   remote_app_name: 41
   local_host_name: 34
   remote_host_name: 27

Now assume that the network communication model generator 120 identifies a match M in the match data 118 having a value V of feature F, where feature cluster A corresponds to feature F (possibly among other features) and where feature cluster A includes value V. In response, the network communication model generator 120 may add an application name cluster feature with a value of "A" (the label or other identifier of feature cluster A) to match M, resulting in the following modified match M:
   local_app_name: 7
   remote_app_name: 41
   remote_app_name_cluster: A
   local_host_name: 34
   remote_host_name: 27

The result is that the match M now contains data identifying a feature cluster (namely, application name feature cluster A) which contains a value (namely, 41) of a feature (namely, the remote_app_name feature) that is in the match M. The network communication model generator 120 may repeat this process for any number of matches (FIG. 9, operation 910) and feature clusters (FIG. 9, operation 912) to modify the match data 118 as described above. This process may be performed before the network communication model generator 120 generates the potential rules 504.

Embodiments of the present invention may create feature clusters in any of a variety of ways, such as the following two examples. One way that embodiments of the present invention may create feature clusters is to analyze communications within the network as a whole. More specifically, for each value V1 observed by the system 100 for feature F in the system 100, the network communication model generator 120 may create a vector representing the other values V2 that are in communication with V1. Such a vector may, for example, contain data representing a "connection strength" between V1 and V2, which may, for example, be equal to or based on the number of times that V1 and V2 are the values of the local and remote versions of the same feature, respectively. For example, "local_app_name" and "remote_app_name" are the local and remote versions of the "app_name" (application name) feature. As a particular example of this technique for creating feature clusters, consider the following match M:
   local_app_name: 7
   remote_app_name: 41
   local_host_name: 34
   remote_host_name: 27

This match indicates that the local application named "7" (V1) is in communication with the remote application named "41" (V2). Now assume that the network communication model generator 120 maintains a vector for application V1, which contains values representing a connection strength between application V1 and other applications. The network communication model generator 120 may initialize such values to zero or any other value(s).

The network communication model generator 120 may, within the vector for V1 (the application named 7), increase the connection strength associated with the remote application named 41 (e.g., by one or some other value) because of the observation, in the above match M, that V1 and V2 are the respective values of the local and remote versions of the same feature (i.e., the app_name feature). Using the same process, the network communication model generator 120 may, within the vector for host name 34, increase the connection strength associated with the remote host named 27 because of the observation, in the above match M, that 34 and 27 are the respective values of the local and remote versions of the host_name feature. This yields a vector, probably sparse (that is, mostly zeros), for each observed application value.

From the vectors for each application, the network communication model generator 120 may derive a "distance" for two applications based on the similarity of their corresponding vectors. Vector similarity can be obtained in a number of ways, the most common being the "normed Euclidean distance".

The network communication model generator 120 may then generate a feature cluster for a particular feature F (such as "app_name" or "host_name") by: (1) sorting all of the distances between the vectors for all observed values of feature F, so that the minimum distance strength is first; and (2) in the sorted order of distances, attaching pairs of values together. For example, if the sorted values of feature F are {2, 4, 5, 8, 12, 15, 20}, and there is a distance for each pair of values, then a feature cluster may be generated for feature F by first adding the pair {2, 4} (which is the pair with the minimal distance) to the feature cluster, resulting in a feature cluster of {2, 4}, and then adding the next closest pair {4, 5}, resulting in a feature cluster of {2, 4, 5}, and so on, until the desired maximum cluster size is reached or no feature values remain to be added to the cluster. If the desired maximum cluster size is reached, then a new empty feature cluster may be created and subsequent feature values may be attached to it using the same process described above, starting with the next feature in the sorted list of feature values.

A cluster is the "transitive closure" of the connections contained in the cluster. That is, if A is attached to B and B is attached to C, then {A, B, C} are in the same cluster. If then C is attached to D, then then cluster becomes {A, B, C, D}. The "Union Find" algorithm can be used to determine this efficiently, while keeping track of the value attachment process.

Embodiments of the present invention may use any of a variety of techniques to decide when to stop attaching values to the current feature cluster and then to create a new feature cluster to which values are then attached. For example, there is a risk that all feature values will be attached into a single cluster. Embodiments of the present invention may protect against this risk by determining, before attaching the next value to the current feature cluster, whether the current feature cluster satisfies the Erdös-Rényi conditions, and then stop adding nodes to the current feature cluster (and create a new current feature cluster to which nodes are added) if those conditions are satisfied.

Once the network communication model generator 120 determines that it is no longer possible to attach values to feature clusters for the current feature, the network communication model generator 120 stops adding nodes to feature clusters for the current feature. At that point, all of the independent transitive closures of attached values become separate feature clusters for that particular feature.

Another example of a method that embodiments of the present invention may use to generate feature clusters is to generate feature clusters after the final rules 502 have been generated, rather than generating the feature clusters before generating the potential rules 504. Instead, the potential rules 504 are generated without generating feature clusters.

The network communication model generator 120 then looks for rules, within the rules 502, which differ from each other by only one value of one feature. For example, consider the following three rules:
local_app_name: 7
remote_app_name: 41
local_host_name: 34
remote_host_name: 27
local_app_name: 7
remote_app_name: 41
local_host_name: 34
remote_host_name: 28
local_app_name: 7
remote_app_name: 41
local_host_name: 34
remote_host_name: 29

All of these rules are the same as each other except that the value of the feature "remote_host_name" differs in each of them. The network communication model generator 120 may determine that these three rules are the same as each other except for the differing value of the single feature "remote_host_name" and, in response to that determination, effectively collapse (combine) the three rules into a single rule by creating the following feature cluster:
local_app_name: 7
remote_app_name: 41
local_host_name: 34
remote_host_name: A
hostCollection A={27, 28, 29}

After that, the new rule replaces the three rules, which are deleted when the new rule is added.

The process of creating feature clusters has several goals which may be in tension with each other: (1) a preference to add a node to an already-existing cluster rather than to create a new cluster; (2) a preference to create a new cluster rather than create a new rule; (3) a preference to have fewer clusters rather than more clusters; (4) a preference for the nodes in a cluster to be as similar to each other as possible, in the sense of "similarity" described above; and (5) a preference for clusters not to exceed a maximum size, which may, for example, be approximately equal to the natural log of the total number of items in the cluster. Embodiments of the present invention may attempt to balance these goals in any of a variety of ways, such as by approximately optimizing each of these goals as much as possible, given the constraints imposed by the other constraints (goals).

Note that the two methods described above for generating feature clusters are merely examples and are not limitations of the present inventions. These two methods may be used individually, in combination with each other, or in combination with other methods not disclosed herein.

Embodiments of the present invention may repeat the methods disclosed herein over time to add new rules within the rules 502, based on all of the accumulated match data 118, as more matches are added to the match data 118. Each new generated set of rules typically will differ somewhat from previously-generated rules as a result of changes in the match data 118 and the non-deterministic nature of the methods used to generate the rules 502.

In practice, once a particular set of the rules 502 has been generated and deployed, a particular user (e.g., organization) may develop and deploy policies to protect the user's critical applications based on the particular set of rules 502. There is a benefit, therefore, to not generating additional rules within the rules 502 which are inconsistent with the rules on which the user's deployed policies were based.

Embodiments of the present invention may train and generate subsequent sets of rules within the rules 502 such that the subsequent rule sets are not inconsistent with existing deployed policies deployed by a customer, where such existing deployed policies were generated based on a previous version of the rules 502, such as by using the following method.

When generating a new set of rules within the rules 502, the network communication model generator 120 may add the deployed customer policies as initial rules to the new rule set (i.e., before adding any automatically-generated rules to the new rule set), and mark such rules as customer-generated rules so that they will not be modified or removed from the new rule set or the rules 502 more generally. Note that these customer-generated rules will typically account for only a small fraction of the matches in the match data 118. This means that these accounted-for matches will have no influence on the remainder of the training, and thus will result in no learned rules. As a result, the effect of adding the customer-generated rules to the new rule set is to remove these accounted-for matches from the match data 118.

The network communication model generator 120 then generates new rules based on the current match data 118 in any of the ways disclosed herein. At the end of this process, the customer-generated rules are removed from the new rules generated by the network communication model generator 120, and then only the latter are returned as the new rules and added to the rules 502. The effect of this is to generate and add new rules to the rules 502 which are consistent with the customer-generated policies.

The match data 118 may include a set pairs, each of which includes: (1) a unique data point representing a corresponding match; and (2) a count for that data point, representing the number of occurrences of the corresponding match. For example, if the match data 118 represents matches A, B, C, D, and E as follows: [A, B, A, C, B, D, A, C, B, A, D, E, C, A], then the system 100 may transform that match data 118 into the following: {A:5, B:3, C:3, D:2, E:1}. For example, "A:5" indicates that match A occurs 5 times in the match data 118. Storing the match data 118 in this form (also known as a "multiset") may enable the match data 118 to be stored more compactly and processed more quickly than in uncompressed form. Note that the system 100 may first generate the match data 118 in uncompressed form and then convert it to compressed (multiset) form, or generate the match data 118 directly in compressed form.

Recalling the use of frequent itemset discovery in the system 500 and method 600 of FIGS. 5 and 6, respectively, the system 500 may associate, with each itemset in the potential rules 504, the subset of unique matches (in the match data 118) that the itemset accepts (as defined above). For example, if potential rule C accepts matches A and D but does not accept match B, C, or E, then the system 500 may associate potential rule C with the subset {A, D} and store data representing this association. Identifying and storing records of such associations may be used to accelerate the calculations performed by the system 500 as follows. Note that if feature clusters have already been created using any of the techniques disclosed herein, then such feature clusters are already within the potential rules 504.

The network communication model generator 120 may select rules, from the potential rules 504, for inclusion in the final rules 502 in any of a variety of ways. The match data 118 may be understood as a multi-set and the potential rules 504 as subsets of that multi-set. The problem of selecting rules from the potential rules 504 for inclusion in the rules 502 may then be seen as an instance of the "weighted set cover" problem. Although it is intractable to find the optimal solution to this problem, embodiments of the present invention may use any of a variety of efficient approximate solutions to this problem to select rules from the potential rules 504 to include in the rules 502.

For example, the network communication model generator 120 may use a "greedy" approach to select rules from the potential rules 504 to include in the rules 502 and then add the selected rules to the rules 502. In particular, the network communication model generator 120 may iterate over the potential rules 504 and, at each iteration, select the rule whose match subset (in the match data 118) has the largest intersection with the set of remaining unique matches (that is, not already covered by a previously-selected rule) and add the selected rule to the rules 502. The network communication model generator 120 may repeat this process until there are no rules in the potential rules 504 which match any remaining unique matches in the match data 118, or until a particular coverage goal is achieved.

Embodiments of the present invention may apply weighting to the process of generating the rules 502 in any of a variety of ways. For example, rules from the potential rules 504 may be chosen for inclusion in the rules 502 based on the cardinality of their subset, i.e.:

uniqueWeight($C$)=length(matchSubset[$C$]).

Alternatively, for example, rules from the potential rules 504 may be chosen for inclusion in the rules based on the sum of the uniqueMatch counts for each item in the subset, i.e.:

totalWeight($C$)=sum(uniqueMatchCount[$m$] for $m$ in matchSubset[$C$])

As yet another example, the network communication model generator 120 may associate each of the potential rules 504 with the frequency of the rule being found in the match data 118. In other words, if two candidate rules are observed M and N times, respectively, in the match data 118 (which may be information supplied by the FP-Growth algorithm), and M>>N then the network communication model generator 120 may prefer the potential rule associated with count N for inclusion in the rules 502, since it carries more information with respect to the match data 118.

As yet another example, the network communication model generator 120 may count individual features in each of the potential rules 504 and prefer rules with less common features over rules with more common features. As yet another example, the network communication model generator 120 may prefer longer rules in the potential rules 504 over shorter rules in the potential rules 504. As yet another example, the network communication model generator 120 may prefer rules in the potential rules 504 which have certain features (or certain combinations of features) over rules not having those features (or combinations of features).

The network communication model generator 120 may use any one or more of the measures described above, in any combination, to select rules from the potential rules 504 in the rules 502. For example, the network communication model generator 120 may combine one or more of the measures described above into an "objective" function, and use the objective function to select rules from the potential rules 504 to include in the rules 502, and then to add the selected rules to the rules 502. For example, the network communication model generator 120 may combine one or more of the measures described above into a single function by adding them together. Furthermore, each feature may be multiplied by a factor that is larger when the feature is more "important," such as by stipulation, or as a result of training on sample sets of data with vetted rules. In another embodiment, one or more of the measures described above are combined into a set of semi-numerical meta-rules, which select a "best" rule from the potential rules 504 for inclusion in the rules 502.

Any use described herein of a greedy algorithm may instead be implemented using a Bayesian algorithm to search through the space of possible rule sets. A Bayesian algorithm may, for example, be implemented using a Markov Chain Monte Carlo (MCMC) algorithm or simulated annealing to search for an optimal rule set. All such approaches may be used to add rules to the rules 502, to replace rules in the rules 502, and to delete rules from the rules 502. Any such move (i.e., addition, replacement, or deletion) may be selected based on the objective function described herein. Then, embodiments of the present invention may accept or reject the move, with a probability that depends on the quality of the new set of rules being better or not much worse than the current rule set. Eventually, embodiments of the present invention converge on a nearly optimal set of rules 502.

In general, one advantage of embodiments of the present invention is that they may be used to generate the network communication model automatically by observing and analyzing existing network communications. This solution eliminates various problems associated with manual network communication model generation, such as the amount of time and effort required to generate and update such a model manually.

Another advantage of embodiments of the present invention is that they may be used to generate the network communication model even in the absence of training data in which particular network communications are labeled as "healthy" (i.e., desired to be permitted) or "unhealthy" (i.e., desired to be blocked), while striking a balance between being permissive enough to permit healthy but previously unseen network communications (e.g., network communications that have properties different than the communications that were used to generate the model 104) and being restrictive enough to block previously-unseen and unhealthy network communications.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention automatically collect information about communications between networked applications. Such collection can only be performed by computer systems and not by humans. Furthermore, embodiments of the present invention can generate the network communication model 104 by collecting and processing very large volumes of data, such as billions of matches, which would be impossible for a human to perform. For at least these reasons, embodiments of the present invention are inherently directed to computer-implemented systems and methods. Furthermore, embodiments of the present invention are directed to a problem—namely, improving security of networked communications between computer applications—which is inherently rooted in computer and Internet technology.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method comprising:
receiving flow objects from a plurality of computer systems, wherein each flow object is data based on communication associated with a first application at a first computer system that operates with a second application at a second computer system;
matching the flow objects with one another to determine match data, wherein two flow object match when they represent two corresponding flows at opposite ends of an application-to-application communication;
creating rule candidates within a network communication model generator, the rule candidates serving as an initial set of rules;
utilizing one of an evolutionary algorithm and a greedy algorithm to window down a set of rules from the initial set of rules; and
generating the network communication model based on the match data wherein the network communication model is or contains the winnowed set of rules resulting from the initial set of rules and is in a readable and modifiable form, and wherein the network communication model is configured to label a particular communication in the network as one of desired to be permitted or blocked.

2. The method of claim 1, wherein the generating is performed utilizing unsupervised learning.

3. The method of claim 1, wherein the generating includes:
performing one or more passes over the match data;
growing rule trees in the network communication model based on evidence in the match data; and
terminating the multiple passes based on a stopping point.

4. A non-transitory computer-readable medium having computer program instructions stored thereon, the computer program instructions being executable by at least one computer processor in a remote server communicatively coupled to a network to perform steps of:
receiving flow objects from a plurality of computer systems, wherein each flow object is data based on communication associated with a first application at a first computer system that operates with a second application at a second computer system;
matching the flow objects with one another to determine match data, wherein two flow object match when they represent two corresponding flows at opposite ends of an application-to-application communication;
creating rule candidates within a network communication model generator, the rule candidates serving as an initial set of rules;
utilizing one of an evolutionary algorithm and a greedy algorithm to window down a set of rules from the initial set of rules; and
generating the network communication model based on the match data wherein the network communication model is or contains the winnowed set of rules resulting from the initial set of rules and is in a readable and modifiable form, and wherein the network communication model is configured to label a particular communication in the network as one of desired to be permitted or blocked.

5. The non-transitory computer-readable medium of claim 4, wherein the steps further include:
providing the network communication model for labeling ongoing communications in the network based on the received flow objects.

6. The non-transitory computer-readable medium of claim 4, wherein the generating is performed utilizing unsupervised learning.

7. The non-transitory computer-readable medium of claim 4, wherein the generating includes:
performing one or more passes over the match data;
growing rule trees in the network communication model based on evidence in the match data; and
terminating the multiple passes based on a stopping point.

8. The non-transitory computer-readable medium of claim 7, wherein the growing includes adding a new child node to the rule trees, with the new child node representing a feature-value pair representing sufficient evidence in the match data.

9. The non-transitory computer-readable medium of claim 7, wherein the stopping point is based on one of a plurality of criteria including a certain number of matches, a certain number of the one or more passes, slowing of growth of the rules trees, and a certain size of the rule trees.

10. The non-transitory computer-readable medium of claim 7, wherein the network communication model includes the rule trees subsequent to the terminating.

11. The non-transitory computer-readable medium of claim 4, wherein the match data includes significantly more permitted communications than blocked communications.

12. The non-transitory computer-readable medium of claim 4, wherein each flow object is generated locally at each computer system based on collected underlying network information.

13. A remote server comprising:
at least one computer processor; and
memory having computer program instructions, the computer program instructions being executable by the at least one computer processor communicatively coupled to a network to perform steps of:
receiving flow objects from a plurality of computer systems, wherein each flow object is data based on communication associated with a first application at a first computer system that operates with a second application at a second computer system;
matching the flow objects with one another to determine match data, wherein two flow object match when they represent two corresponding flows at opposite ends of an application-to-application communication;
creating rule candidates within a network communication model generator, the rule candidates serving as an initial set of rules;
utilizing one of an evolutionary algorithm and a greedy algorithm to window down a set of rules from the initial set of rules; and generating the network communication model based on the match data wherein the network communication model is or contains the winnowed set of rules resulting from the initial set of rules and is in a readable and modifiable form, and wherein the network communication model is configured to label a particular communication in the network as one of desired to be permitted or blocked.

14. The remote server of claim 13, wherein the steps further include:
providing the network communication model for labeling ongoing communications in the network based on the received flow objects.

15. The remote server of claim 13, wherein the generating is performed utilizing unsupervised learning.

16. The remote server of claim 13, wherein the generating includes:
performing one or more passes over the match data;
growing rule trees in the network communication model based on evidence in the match data; and
terminating the multiple passes based on a stopping point.

17. The remote server of claim 16, wherein the growing includes adding a new child node to the rule trees, with the new child node representing a feature-value pair representing sufficient evidence in the match data.

18. The remote server of claim 16, wherein the stopping point is based on one of a plurality of criteria including a certain number of matches, a certain number of the one or more passes, slowing of growth of the rules trees, and a certain size of the rule trees.

19. The remote server of claim 16, wherein the network communication model includes the rule trees subsequent to the terminating.

20. The remote server of claim 13, wherein the match data includes significantly more permitted communications than blocked communications.

* * * * *